(12) United States Patent
Bheemanna et al.

(10) Patent No.: US 10,248,534 B2
(45) Date of Patent: Apr. 2, 2019

(54) TEMPLATE-BASED METHODOLOGY FOR VALIDATING HARDWARE FEATURES

(71) Applicant: International Business Machines Corporation, Armonk, NY (US)

(72) Inventors: Purushotam Bheemanna, Bangalore (IN); Niraj K. Pandey, Noida (IN)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 15/362,902

(22) Filed: Nov. 29, 2016

(65) Prior Publication Data

US 2018/0150319 A1 May 31, 2018

(51) Int. Cl.
| | |
|---|---|
| *G06F 11/36* | (2006.01) |
| *G06F 11/34* | (2006.01) |
| *G06F 9/46* | (2006.01) |
| *G06F 11/263* | (2006.01) |
| *G06F 11/30* | (2006.01) |
| *G06F 9/48* | (2006.01) |

(52) U.S. Cl.
CPC ............... *G06F 11/36* (2013.01); *G06F 9/48* (2013.01); *G06F 9/485* (2013.01); *G06F 9/4843* (2013.01); *G06F 11/263* (2013.01); *G06F 11/3003* (2013.01); *G06F 11/3024* (2013.01); *G06F 11/34* (2013.01); *G06F 11/3447* (2013.01); *G06F 11/3466* (2013.01); *G06F 11/3668* (2013.01); *G06F 11/3672* (2013.01); *G06F 11/3676* (2013.01); *G06F 11/3696* (2013.01)

(58) Field of Classification Search
CPC .......... G06F 9/48; G06F 9/4843; G06F 9/485; G06F 11/3003; G06F 11/3024; G06F 11/34; G06F 11/3447; G06F 11/3466; G06F 11/3668; G06F 11/3672; G06F 11/3676; G06F 11/3696
See application file for complete search history.

(56) References Cited

U.S. PATENT DOCUMENTS

| | | | | |
|---|---|---|---|---|
| 7,647,219 | B2 * | 1/2010 | Overturf ............. | G06F 11/3688 703/16 |
| 8,549,532 | B2 | 10/2013 | Ganesh | |
| 2009/0198484 | A1 * | 8/2009 | Christensen ........ | G06F 11/3668 703/22 |
| 2010/0088702 | A1 * | 4/2010 | Dern ....................... | G06F 9/528 718/101 |
| 2011/0107307 | A1 * | 5/2011 | Liu ...................... | G06F 11/3664 717/125 |
| 2012/0089873 | A1 * | 4/2012 | Wang .................. | G06F 11/3688 714/33 |
| 2012/0260132 | A1 * | 10/2012 | Blue ................... | G06F 11/3676 714/38.1 |
| 2012/0304160 | A1 * | 11/2012 | Soeder ................. | G06F 9/4486 717/148 |

(Continued)

*Primary Examiner* — Charles M Swift
(74) *Attorney, Agent, or Firm* — David B. Woycechowsky

(57) ABSTRACT

In one embodiment of the present invention, a thread is scheduled for execution by a processor, and the thread includes instructions for testing functionality of a feature of the processor. A workload location on the thread is determined. A hook is placed on the determined workload location. The thread is executed by the processor. In response to encountering the hook during the execution of the thread, a workload is selected from a pool, and the pool includes two or more workloads.

9 Claims, 3 Drawing Sheets

(56) References Cited

U.S. PATENT DOCUMENTS

| | | | |
|---|---|---|---|
| 2013/0036404 A1* | 2/2013 | Shu | G06F 11/3644 717/127 |
| 2014/0025997 A1* | 1/2014 | Heiper | G06F 11/3676 714/38.1 |
| 2015/0058604 A1 | 2/2015 | Arunagiri et al. | |
| 2015/0242245 A1 | 8/2015 | Brown et al. | |
| 2015/0347263 A1* | 12/2015 | Chau | G06F 11/3409 717/130 |

* cited by examiner

TEMPLATE-BASED METHODOLOGY FOR VALIDATING HARDWARE FEATURES

BACKGROUND OF THE INVENTION

The present invention relates generally to the field of computer hardware architecture, and more particularly to validation software.

Validation, also referred to as software quality control, is the process of checking that a software system meets specifications and that it fulfills its intended purpose. It is normally the responsibility of software testers as part of the software development lifecycle. Validation checks that a computer hardware or software design satisfies or fits its intended use. In other words, software validation ensures that a product has been built according to the requirements and design specifications, and ensures that the product actually meets a user's needs.

SUMMARY

Embodiments of the present invention include a method, computer program product, and system for testing functionality of processors. In one embodiment, a thread is scheduled for execution by a processor, and the thread includes instructions for testing functionality of a feature of the processor. A workload location on the thread is determined. A hook is placed on the determined workload location. The thread is executed by the processor. In response to encountering the hook during the execution of the thread, a workload is selected from a pool, and the pool includes two or more workloads.

DETAILED DESCRIPTION

Embodiments of the present invention recognize that user space testing, or validation, software does not allow direct control over privileged hardware features of the user computer. Rather, the software is dependent on the operating system or hypervisor to perform privileged operations. Embodiments of the present invention further recognize that since user space validation software is running at the same time as several other processes, the software, due to scheduling issues, may get descheduled or swapped out, or all threads might not be able to run concurrently. This causes uncertainty as to whether a particular hardware feature is actually being tested to a sufficient extent.

Embodiments of the present invention provide for improving the testing of hardware features by decoupling a workload from a targeted block of test instructions and allowing for increased randomness and stress for a tested hardware feature.

Figure 1:
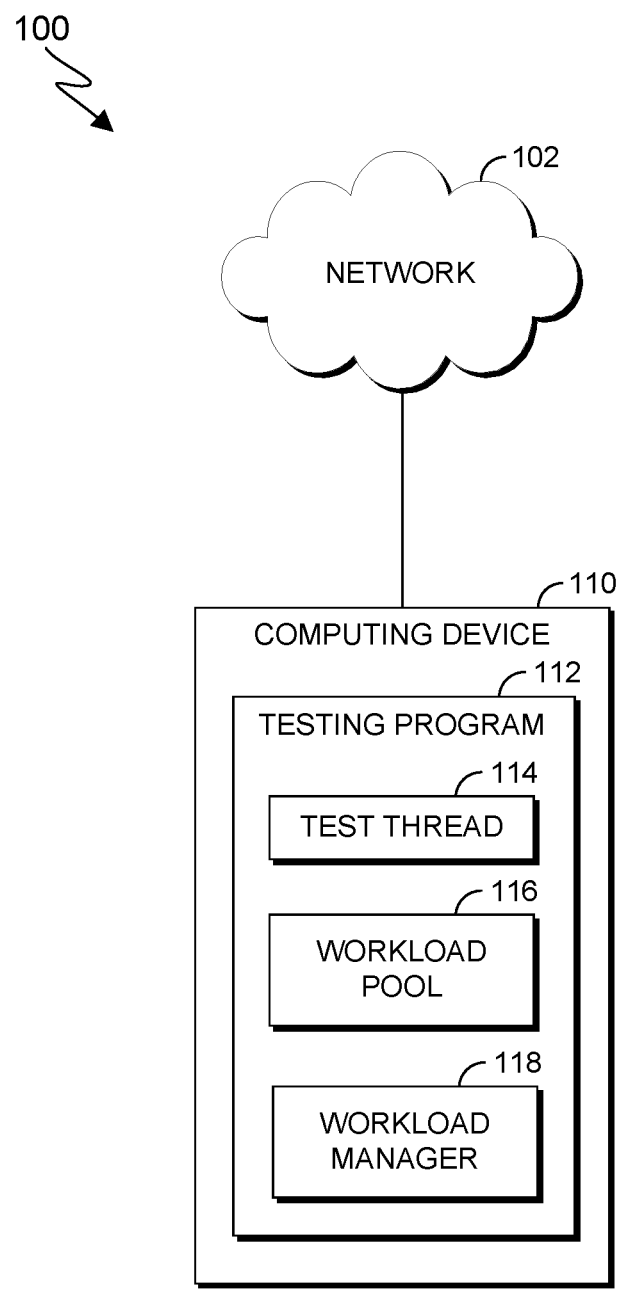
FIG. 1 is a functional block diagram of a distributed data processing environment, in accordance with an embodiment of the present invention.

The present invention will now be described in detail with reference to the Figures. FIG. 1 is a functional block diagram of a computing environment, generally designated 100, in accordance with an embodiment of the present invention.

FIG. 1 provides only an illustration of one implementation and does not imply any limitations with regard to the environments in which different embodiments may be implemented. Those skilled in the art may make many modifications to the depicted environment without departing from the scope of the invention as recited by the claims.

In an embodiment, distributed data processing environment 100 includes computing device 110 and network 102. In an embodiment, network 102 may be a local area network (LAN), a telecommunications network, a wide area network (WAN) such as the Internet, or any combination thereof, and can include wired, wireless, or fiber optic connections. In general, network 102 can be any combination of connections and protocols that will support communications between computing device 110 and any other computing device connected to network 102, in accordance with an embodiment of the present invention.

In an embodiment, computing device 110 is any electronic device or combination of electronic devices capable of executing computer readable program instructions and communicating with any computing device within distributed data processing environment 100. For example, computing device 110 may be a workstation, personal computer, laptop computer, tablet, personal digital assistant, or mobile phone. In an embodiment, computing device 110 may be a computer system utilizing clustered computers and components (e.g., database server computers, application server computers) that act as a single pool of seamless resources when accessed by elements of distributed data processing environment 100, such as in a cloud computing environment. In an embodiment, computing device 110 includes components of computer 300 as depicted and described with respect to FIG. 3. In an embodiment, computing device 110 includes testing program 112, test thread 114, workload pool 116, and workload manager 118.

Figure 3:
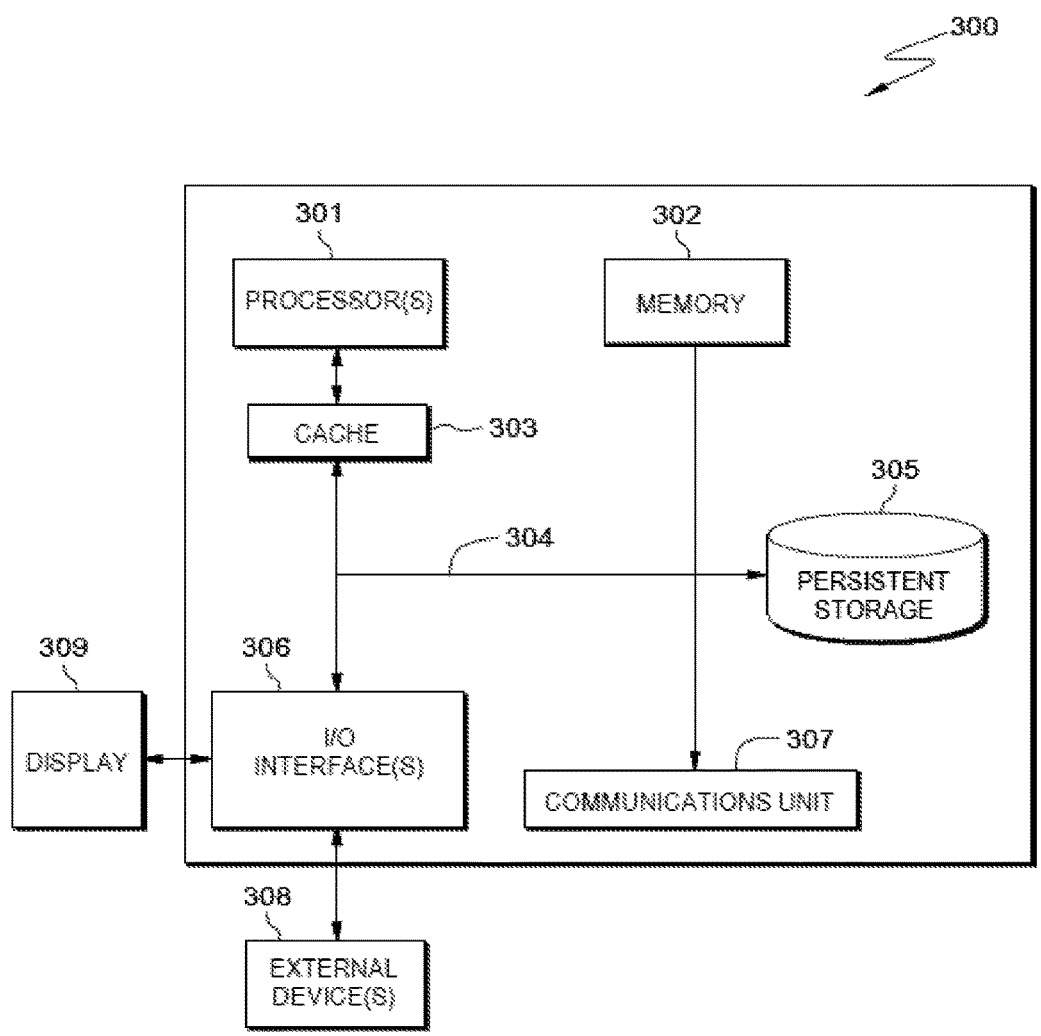
FIG. 3 is a block diagram of components of the computing device of FIG. 1, in accordance with an embodiment of the present invention.

In an embodiment, testing program 112 may be a computer program, application, or subprogram of a larger program, such as an operating system, that operates to test, or validate, the functionality of hardware features of computing device 110. In an embodiment, testing program 112 validates the transactional memory functionality of a processor of computing device 110. In an embodiment, the processor, or processors, of computing device 110 may be substantially similar to processor(s) 301 of computer 300, as depicted in FIG. 3. In an embodiment, testing program 112 may be connected to one or more user interface devices (not shown) to allow a user to utilize testing program 112.

A user interface is the information, such as graphic, text, and sound, a program presents to a user and the control sequences the user employs to control the program. There are many types of user interfaces. For example, the user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. GUIs were introduced for computers in response to the perceived steep learning curve of command-line interfaces, which required commands to be typed on the keyboard. The actions in GUIs may be performed by a user through direct manipulation of the graphical elements.

In an embodiment, testing program 112 includes a test thread 114, which may be scheduled to be processed by the processor being tested. In an embodiment, a test thread 114 may include a test block of instructions and one or more workload hooks (i.e., callback functions). In an embodiment, a test block may be a sequence of instructions that is designed to test the functionality of a hardware feature of computing device 110. For example, where a test block is designed to test the transactional memory functionality of the processors of computing device 110, the test block may be a transaction (i.e., an atomic, isolated set of instructions) that includes instructions to find the product of A×B×C, where A, B, and C are data blocks in a memory of computing device 110. In an embodiment, each workload hook point to, or corresponds to, a workload located in workload pool 116. In an embodiment, a workload may be any sequence of instructions, e.g., as a subroutine of testing program 112, that includes a task for a processor to perform. For example, a workload may be instructions for a processor to copy data from one location in computing device 110 to another location. By using workload hooks, the workload is decoupled, or independent, from the test block instructions.

In an embodiment, testing program 112 includes workload manager 118. In an embodiment, workload manager 118 may be a subprogram or module of testing program 112 that operates to place workload hooks on test thread 114 and, in response to the processor encountering a workload hook, to select and provide a workload from workload pool 116. In an embodiment, testing program 112 may include policies for default workload hook placement on the test thread 114 and workload selection. In a multi-core processing environment, where multiple test threads are each processed by a different processor core, each test thread 114 corresponds to a separate, distinct workload manager 118.

In the illustrated embodiment, testing program 112 is located on computing device 110. In an alternative embodiment, testing program 112 may be located on another networked computer (not shown), and testing program 112 may access and communicate with computing device 110 through network 102.

In an embodiment, workload pool 116 contains the pool of workloads utilized by testing program 112. In response to the processor encountering a workload hook, workload manager 118 may access the workload pool to select and provide a workload to be processed. The workload pool may include any number of workloads. As the number of workloads increases, the randomness of which workload corresponds to which workload hook increases. In this manner, and to such extent, the randomness of the workload to be processed may be controlled.

In an embodiment, workload pool 116 may be implemented using any non-volatile storage media known in the art. For example, workload pool 116 may be implemented with a tape library, optical library, one or more independent hard disk drives, or multiple hard disk drives in a redundant array of independent disks (RAID). Workload pool 116 may be implemented using any suitable storage architecture known in the art. For example, workload pool 116 may be implemented with a relational database or an object-oriented database.

Figure 2:
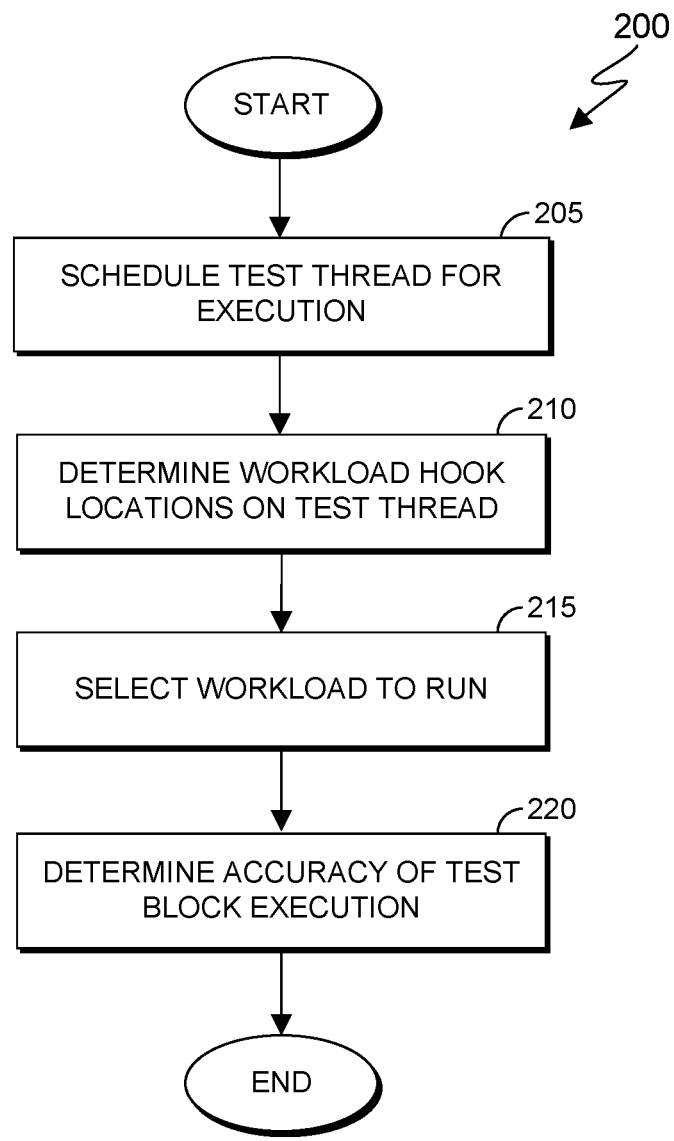
FIG. 2 is a flowchart of operational steps for validating the functionality of hardware features.

FIG. 2 is a flowchart of workflow 200 illustrating operational steps for validating the functionality of hardware features. In the illustrated embodiment, the steps of workflow 200 are performed by testing program 112. In an alternative embodiment, the steps of workflow may be performed by any other computer program, or programs, while working with testing program 112. In an embodiment, testing program 112 begins performing the steps of workflow 200 in response to receiving an indication to validate the functionality of a hardware feature. In an embodiment, a user may provide the through the user interface of testing program 112.

Testing program 112 instructs a scheduler to schedule test thread 114 for execution (step 205). In other words, testing program 112 instructs a thread scheduler (not shown) of computing device 110 to schedule test thread 114 on a thread to be processed by a processor (tested processor) of computing device 110. In an embodiment, in a multiprocessor (or multicore) environment, testing program 112 instructs the thread scheduler to schedule a test thread to each of the processors. In an embodiment, each of the test threads scheduled to the processors may utilize a shared memory in computing device 110 during execution in order to increasing the likelihood of causing cache conflicts and further stress each tested processor.

Testing program 112 determines workload hook locations on test thread 114 (step 210). In other words, testing program 112 determines where to place one or more workload hooks on a test thread. In an embodiment, each workload hook is a callback function that points to a workload in workload pool 116 to be executed at runtime. Testing program 112 may place any number of workload hooks on the test thread, and testing program 112 may place a workload at any location on the test thread. In this manner, the workloads are independent of and decoupled from the test block of instructions.

In an embodiment, default workload hook locations or location-selecting policies are provided in testing program 112. In an embodiment, workload hook locations are randomly selected by workload manager 118. In an embodiment, workload hooks are placed immediately before and after a test block of instructions. As an example, where the test block is a transaction, workload hooks may be placed before a "section begin" instruction and after a "section end" instruction of the test block. In an embodiment, where computing device 110 contains multiple processors, and each processor has a test thread, workload hook locations for each test thread are determined independently from workload hook locations for each of the other test threads of the other processors.

Testing program 112 selects a workload to run (step 215). In an embodiment, for each workload hook, workload manager 118 randomly selects a workload from workload pool 116 to run upon the workload hook being encountered at the time of execution. In an alternative embodiment, workload manager 118 selects a workload according to a selection policy. Where a workload is randomly selected for each workload hook, as the number of workloads in workload pool 116 increases, the randomness of the workload selected also increases. In an embodiment, workload pool 116 may include any number of workloads. In an embodiment, multiple workload hooks on test thread 114 may each point to a same workload in workload pool 116. In an alternative embodiment, each workload hook may point to a different workload. In an embodiment, a workload may be a sequence of instructions (e.g. a subroutine) with a task to be performed by the tested processor. For example, a workload may instruct the tested processor to copy data from one memory location to another.

Testing program 112 determines the accuracy of the test block execution (step 220). In other words, testing program 112 checks if the tested processor successfully executed the test block of test thread 114. In an embodiment, a consistency model is used to determine the accuracy of the result. For example, where two processors of computing device 110 are each executing a separate test thread concurrently, the result from one of the processors is compared against the result from the other processor. If the results are the same, then testing program 112 determines that the tests are successful. To further illustrate, where each of the test blocks include instructions to find the result of multiplying A×B×C, if each of the processors determines that the result is "64", then testing program 112 determines that each processor successfully executed test thread 114. In an alternative embodiment, a reference model is used to determine the accuracy of the result. For example, the result of executing the test block is compared against the value known to testing program 112.

FIG. 3 depicts computer 300, which illustrates an example of a system that includes testing program 112. Computer 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 may be implemented with one or more buses or a crossbar switch.

Memory 302 and persistent storage 305 are computer readable storage media. In this embodiment, memory 302 includes random access memory (RAM). In general, memory 302 may include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 through I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   creating a workload pool including a plurality of workloads;
   receiving a definition of a test thread including: (i) a test block of instructions for testing functionality of a processor, and (ii) a first workload hook in the form of a callback function identifying a first workload of the plurality of workloads;
   executing, by the processor, a test thread according to the test thread definition, with the execution of the test thread including:
   responsive to encountering the first workload hook, performing the callback function of the first workload hook,
   responsive to performance of the callback function, retrieving the first workload from the workload pool,
   responsive to the retrieval of the first workload, performing the first workload by executing the test block of instructions to obtain first test results; and
   communicating the test results to a user to test at least some of the functionality of the processor;
   wherein the use of the callback function of the first workload hook and the retrieval of the first workload from the workload pool decouples a definition of the test thread from the first workload performed by the test thread to obtain the first test results.

2. The method of claim 1 further comprising:
   randomly determining the first workload from among the plurality of workloads in the workload pool;
   responsive to the random determination of the first workload, generating code of the first workload hook to include the callback function to the first workload; and
   placing the hook in the definition of the test thread.

3. The method of claim 2 wherein the placing of the first workload hook in the definition of the test thread includes placing the workload hook immediately before the test block of instructions.

4. A computer program product (CPP) comprising:
   a computer readable storage medium; and
   computer code stored on the computer readable storage medium, with the computer code including instructions for causing a processor(s) set to perform operations including the following:
   creating a workload pool including a plurality of workloads, receiving a definition of a test thread including: (i) a test block of instructions for testing functionality of a processor, and (ii) a first workload hook in the form of a callback function identifying a first workload of the plurality of workloads,
   executing, by the processor, a test thread according to the test thread definition, with the execution of the test thread including:

responsive to encountering the first workload hook, performing the callback function of the first workload hook, responsive to performance of the callback function, retrieving the first workload from the workload pool, responsive to the retrieval of the first workload, performing the first workload by executing the test block of instructions to obtain first test results, and communicating the test results to a user to test at least some of the functionality of the processor, wherein the use of the callback function of the first workload hook and the retrieval of the first workload from the workload pool decouples a definition of the test thread from the first workload performed by the test thread to obtain the first test results.

5. The CPP of claim 4 wherein the computer code further includes instructions for causing the processor(s) set to perform the following operations:

randomly determining the first workload from among the plurality of workloads in the workload pool;

responsive to the random determination of the first workload, generating code of the first workload hook to include the callback function to the first workload; and placing the hook in the definition of the test thread.

6. The CPP of claim 5 wherein the placing of the first workload hook in the definition of the test thread includes placing the workload hook immediately before the test block of instructions.

7. A computer system (CS) comprising:

a processor(s) set;

a machine readable storage device; and computer code stored on the machine readable storage device, with the computer code including instructions for causing the processor(s) set to perform operations including the following:

creating a workload pool including a plurality of workloads, receiving a definition of a test thread including: (i) a test block of instructions for testing functionality of a processor, and (ii) a first workload hook in the form of a callback function identifying a first workload of the plurality of workloads, executing, by the processor, a test thread according to the test thread definition, with the execution of the test thread including:

responsive to encountering the first workload hook, performing the callback function of the first workload hook, responsive to performance of the callback function, retrieving the first workload from the workload pool, responsive to the retrieval of the first workload, performing the first workload by executing the test block of instructions to obtain first test results, and communicating the test results to a user to test at least some of the functionality of the processor, wherein the use of the callback function of the first workload hook and the retrieval of the first workload from the workload pool decouples a definition of the test thread from the first workload performed by the test thread to obtain the first test results.

8. The CS of claim 7 wherein the computer code further includes instructions for causing the processor(s) set to perform the following operations:

randomly determining the first workload from among the plurality of workloads in the workload pool;

responsive to the random determination of the first workload, generating code of the first workload hook to include the callback function to the first workload; and placing the hook in the definition of the test thread.

9. The CS of claim 8 wherein the placing of the first workload hook in the definition of the test thread includes placing the workload hook immediately before the test block of instructions.

* * * * *